(12) United States Patent
Ohkawa et al.

(10) Patent No.: US 7,816,819 B2
(45) Date of Patent: Oct. 19, 2010

(54) MOTOR WITH COVER MEMBER INTERGRALLY FORMED WITH A STATOR AND HOLDING A CONNECTOR PIN

(75) Inventors: Takanori Ohkawa, Susono (JP); Takashi Ida, Susono (JP); Osamu Kodaira, Susono (JP)

(73) Assignee: Mitsubishi Materials C.M.I. Corporation, Shizuoka (JP)

( * ) Notice: Subject to any disclaimer, the term of this patent is extended or adjusted under 35 U.S.C. 154(b) by 877 days.

(21) Appl. No.: 10/583,761

(22) PCT Filed: Jan. 27, 2005

(86) PCT No.: PCT/JP2005/001072

§ 371 (c)(1),
(2), (4) Date: Jun. 21, 2006

(87) PCT Pub. No.: WO2005/083870

PCT Pub. Date: Sep. 9, 2005

(65) Prior Publication Data

US 2009/0140584 A1    Jun. 4, 2009

(30) Foreign Application Priority Data

Mar. 1, 2004 (JP) .............................. 2004-056429

(51) Int. Cl.
*H02K 3/30* (2006.01)
*H02K 5/167* (2006.01)

(52) U.S. Cl. ................... 310/43; 310/71; 310/90

(58) Field of Classification Search ... 310/49.13–49.14, 310/412, 411, 416
See application file for complete search history.

(56) References Cited

U.S. PATENT DOCUMENTS 4,333,026 A * 6/1982 Bock et al. .................... 310/42

(Continued)

FOREIGN PATENT DOCUMENTS

JP            59-135087           9/1984

(Continued)

OTHER PUBLICATIONS

Machine translation of JP 05-207725 A, "PM Type Stepping Motor and Manufacture Thereof", Aug. 13, 1993, Soya, Yasushi.*

(Continued)

*Primary Examiner*—Quyen Leung
*Assistant Examiner*—Eric Johnson
(74) *Attorney, Agent, or Firm*—Wenderoth, Lind & Ponack, L.L.P.

(57) ABSTRACT

A motor having a rotor in which a rotor magnet is fixed on the outer peripheral surface of a rotor body. The motor is configured so that the support shaft portion is formed of a material having a self-lubricating property, and a first sliding surface of the support shaft portion is supported rotatably. Also, the motor is configured so as to have a metallic motor casing, a rotor provided in the motor casing to drive a motor shaft projecting from the motor casing through a shaft hole in an end wall portion, a stator provided around the rotor in the motor casing to rotationally drive the rotor, a cover member provided to close the other end opening of the motor casing, and a connector body integrally formed of a resin so as to seal the other end opening of the motor casing from the outside of the cover member.

3 Claims, 3 Drawing Sheets

U.S. PATENT DOCUMENTS

| | | | |
|---|---|---|---|
| 4,528,473 A | | 7/1985 | Tezuka |
| 4,720,650 A | * | 1/1988 | Hanamori et al. ............ 310/266 |
| 5,006,742 A | * | 4/1991 | Strobl et al. .................. 310/88 |
| 5,254,892 A | * | 10/1993 | Bosman et al. ............ 310/49 R |
| 5,334,897 A | * | 8/1994 | Ineson et al. .................. 310/89 |
| 6,049,151 A | * | 4/2000 | Suzuki et al. ................. 310/80 |
| 6,492,751 B1 | | 12/2002 | Ineson et al. |
| 6,674,208 B2 | * | 1/2004 | Ineson et al. ................ 310/190 |
| 6,879,071 B2 | * | 4/2005 | Kanazawa et al. ............ 310/71 |
| 7,406,747 B2 | * | 8/2008 | Chol .......................... 16/239 |

FOREIGN PATENT DOCUMENTS

| | | | |
|---|---|---|---|
| JP | 59-138387 | | 9/1984 |
| JP | 4-61454 | | 5/1992 |
| JP | 05207725 A | * | 8/1993 |
| JP | 8-28958 | | 3/1996 |
| JP | 2000-224785 | | 8/2000 |
| JP | 2004-48904 | | 2/2004 |

OTHER PUBLICATIONS

Abstract of JP 05-207725 A, "PM Type Stepping Motor and Manufacture Thereof", Aug. 13, 1993, Soya, Yasushi.*

* cited by examiner

MOTOR WITH COVER MEMBER INTERGRALLY FORMED WITH A STATOR AND HOLDING A CONNECTOR PIN

BACKGROUND OF THE INVENTION

1. Technical Field

The present invention relates to a motor provided with a rotor having a rotor magnet arranged at the periphery thereof, the motor being configured so that an importance is attached to the airtightness and heat dissipating properties.

2. Background Art

As the motor of this type, for example, a stepping motor described in Patent Document 1 has been known. This stepping motor is constructed so that a rotor to which a rotor magnet is fixed is provided on the outer peripheral surface of a support shaft portion, and the rotor is rotatably supported on the outer peripheral surface of the support shaft portion by a roller bearing. Also, the whole of the motor is covered with a resin to hold the airtightness.

However, in the above-described conventional stepping motor, since the support shaft portion of the rotor is supported by the roller bearing, a space region occupied by the roller bearing is large, which presents a problem in making the motor small in size. Also, the covering of the whole of the motor with a resin causes a hindrance to the miniaturization of motor.

Further, in the above-described conventional stepping motor, since the whole of the motor is covered with a resin having high heat insulating properties, the heat dissipating properties deteriorate, which also presents a problem in that the durability is decreased by a rise in temperature in the motor. Especially in the case of a stepping motor, since the position of an output shaft is also controlled by maintaining the energization a coil, the interior of motor is liable to become hot. Therefore, the heat dissipating properties must be improved.

[Patent Document] Japanese Patent Publication No. 8-28958

SUMMARY OF THE INVENTION

The present invention has been made in view of the above situation, and accordingly objects thereof are to provide a motor capable of being made small in size by omitting a bearing used conventionally and a resin for covering the motor, and to provide an enclosed motor capable of improving the durability by enhancing the heat dissipating properties.

To solve the above problems, a motor in accordance with a first aspect of the present invention is characterized by including a metallic motor casing having a peripheral wall portion formed in a cylindrical shape and an end wall portion for closing one end opening of the peripheral wall portion; a rotor provided in the motor casing to drive an output shaft projecting from the motor casing through a shaft hole in the end wall portion; a stator provided around the rotor in the motor casing to rotationally drive the rotor; a cover member provided to close the other end opening of the motor casing; and a connector body integrally formed of a resin so as to seal the other end opening of the motor casing from the outside of the cover member.

According to the motor constructed as described above, since there is provided the connector body integrally formed of a resin so as to seal the other end opening of the motor casing from the outside of the cover member, the interior of motor casing can be sealed easily and surely, for example, merely by injection molding the connector body.

Also, although a portion near the other end opening of the motor casing is covered by the resin of connector body for sealing the opening, most portions of the peripheral wall portion formed in a cylindrical shape and the end wall portion are not covered by the resin. Specifically, most portions of the metallic motor casing are in an exposed state. Therefore, the heat generated in the interior can be dissipated efficiently to the outside through the motor casing.

Therefore, the temperature in the motor casing can be decreased, and hence the durability can be improved. Moreover, since the portion of motor casing covered by the resin is small, a small diameter and light weight can be achieved, and also the cost can be reduced by a decrease in the quantity of resin used.

In the above-described motor, the cover member is formed integrally with the stator using the resin integrally forming the stator, and also formed so as to integrally hold connector pins the distal end portions of which are arranged in the connector body when the connector body is formed. The proximal end portion of the connector pin serves as a terminal for connecting the end portion of a coil of the stator.

In the case of such a configuration, work for winding the coil on the stator and for connecting the end portion of the coil to the terminal by soldering etc. can be carried out continuously, and also this work can be mechanized. The other end opening of the motor casing can be closed merely by inserting the integrated stator and cover member in the motor casing.

Therefore, the assembling work and assembling process can be simplified, so that the proportion defective can be decreased, and also the cost can be reduced.

Also, in the above-described motor, the terminal of the connector pin is located on the outside in the axial direction of the bobbin on which the coil is wound in the stator, and is provided so as to extend to the outer periphery side of the bobbin along the end surface in the axial direction of the bobbin. According to such a configuration, the work efficiency at the time when the end portion of coil is connected to the terminal can be increased.

Also, in the above-described motor, a sub-cover member, which enables the exposure of the terminal, is provided in a portion corresponding to the terminal in the cover member. In this case, by removing the sub-cover member, the connection of the end portion of coil to the terminal can be accomplished easily, and by installing the sub-cover member, the other end opening of the motor casing can be closed surely.

Further, in the above-described motor, the connector body is configured so that a surface directed toward the end wall portion side in the axial direction of the motor casing serves as a flange surface for being installed to a member to which the motor is installed by being brought into contact with the member to which the motor is installed. According to such a configuration, the connector body can be fixed stably to the member to which the motor is installed. Also, for example, when the motor casing is inserted in the member to which the motor is installed, the periphery of the inserted portion of the member to which the motor is installed can be kept airtight by the flange surface.

Also, in the above-described motor, the rotor has a support shaft portion formed of a material having a self-lubricating property and a rotor magnet fixed on the outer peripheral surface of the support shaft portion, and the outer peripheral surface of the support shaft portion is supported rotatably. When the rotor having such a construction is used, a resin covering the motor and a bearing can be omitted, so that far greater effects of decreased size etc. can be achieved.

Also, a motor in accordance with a second aspect of the present invention is a motor having a rotor in which a rotor magnet is fixed on the outer peripheral surface of a support shaft portion, which is characterized in that the support shaft portion is formed of a material having a self-lubricating property, and for example, the outer peripheral surface at the position projecting from the rotor magnet to the axial direction of the support shaft portion is supported rotatably.

According to the motor constructed as described above, since the support shaft portion of the rotor is formed of a material having a self-lubricating property, and the outer peripheral surface of the support shaft portion is supported rotatably, a bearing such as a roller bearing, which has conventionally been needed to rotationally support the rotor, can be omitted.

Therefore, the motor can be made small in size. Moreover, since the omission of bearing can decrease the number of parts, light weight, simplified construction, and low cost can be achieved, and also the productivity can be improved because of simplified construction.

Further, in the motor described above, a wear-resistant tubular member of a small size may be mounted on a rotary support portion for the rotor so that an outer peripheral surface of the support shaft portion is rotatably supported through the tubular member. This will permit restriction of frictional wear at the support shaft portion and the rotary support portion, and will be directed to improvements in durability as well as accuracy of parts (especially accuracy of parts in a radial direction) with, at the same time, the pursuit of downsizing and miniaturization is being maintained, In the above-described motor, it is preferable that the end surface in the axial direction of the support shaft portion be supported slidably. According to such a configuration, a bearing in the thrust direction can also be omitted.

Also, in the above-described motor, it is preferable that as the material of the support shaft portion, a resin having a self-lubricating property be used. When such a resin is used as the material of the support shaft portion, the support shaft portion can be formed easily by molding, and also in the process of molding, the rotor magnet can be fixed surely to the support shaft portion.

Also, in the above-described motor, the rotor magnet may be fixed on the outer peripheral surface of the support shaft portion, for example, by pressing-in, bonding, or post-molding of a resin magnet, or may be fixed on the outer peripheral surface of the support shaft portion by molding the support shaft portion in a state in which the rotor magnet is arranged at the outer periphery. In both of the cases, the rotor magnet can be fixed to the support shaft portion easily. Further, when the support shaft portion is molded in the state in which the rotor magnet is arranged at the outer periphery, in the process in which the support shaft portion is molded, the rotor magnet can be fixed to the support shaft portion surely.

Also, in the above-described motor, it is preferable that at a position corresponding to one end surface in the axial direction of the support shaft portion, a thrust bearing surface which is in slidably contact with the one end surface be provided, and at a position corresponding to the other end surface in the axial direction of the support shaft portion, urging means for urging from the other end surface side toward the thrust bearing surface side be provided. According to such a configuration, since one end surface of the support shaft portion can be brought into contact with the thrust bearing surface by the urging force from the urging means, the rotor can be prevented from being displaced in the axial direction.

Further, in the motor described above, a small-sized, wear-resistant disc-shaped member can be provided between one of the axial end surfaces of the support shaft portion and the thrust bearing surface. This can provide improvements in durability and accuracy of parts (particularly, the parts in the axial direction).

DESCRIPTION OF SYMBOLS

Figure 1:
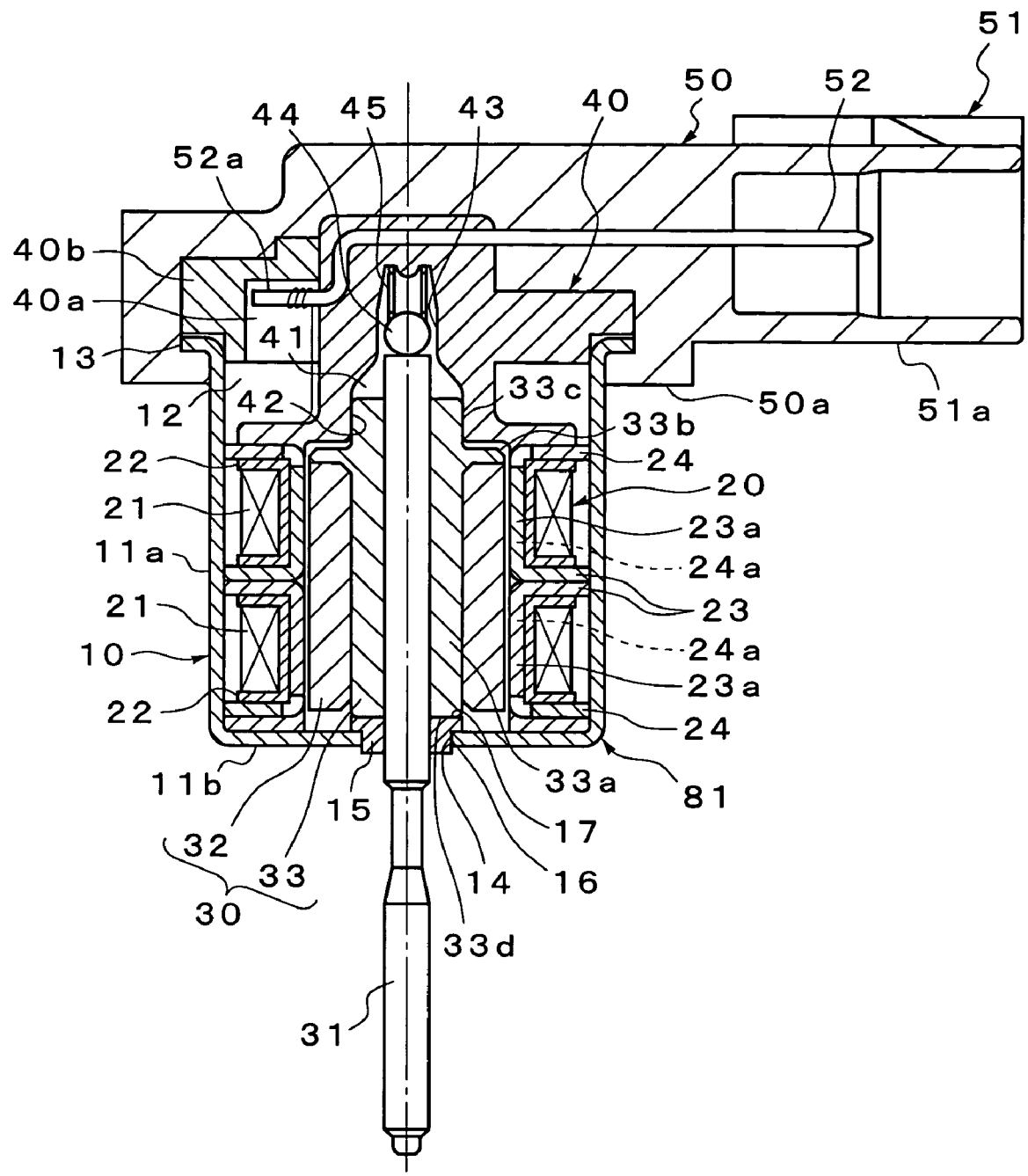
FIG. 1 is a sectional view of a stepping motor, showing one embodiment of the present invention.

10 Motor casing
11a Peripheral wall portion
11b End wall portion
12 The other end opening
14 Shaft hole
15 Bearing bush
17 Thrust bearing surface
20 Stator
21 Coil
30 Rotor
31 Motor shaft (output shaft)
32 Magnet
33 Rotor body (support shaft portion)
33c First sliding surface (outer peripheral surface)
33d Second sliding surface (one end surface)
40 Cover member
40b Sub-cover member
42 Radial bearing surface
44 Steel ball
45 Pressing spring (urging means)
50 Connector body
50a Flange surface
51 Waterproof connector
52 Connector pin
52a Terminal

DETAILED DESCRIPTION OF THE INVENTION

One embodiment of the present invention will now be described with reference to the accompanying drawings.

Figure 2:
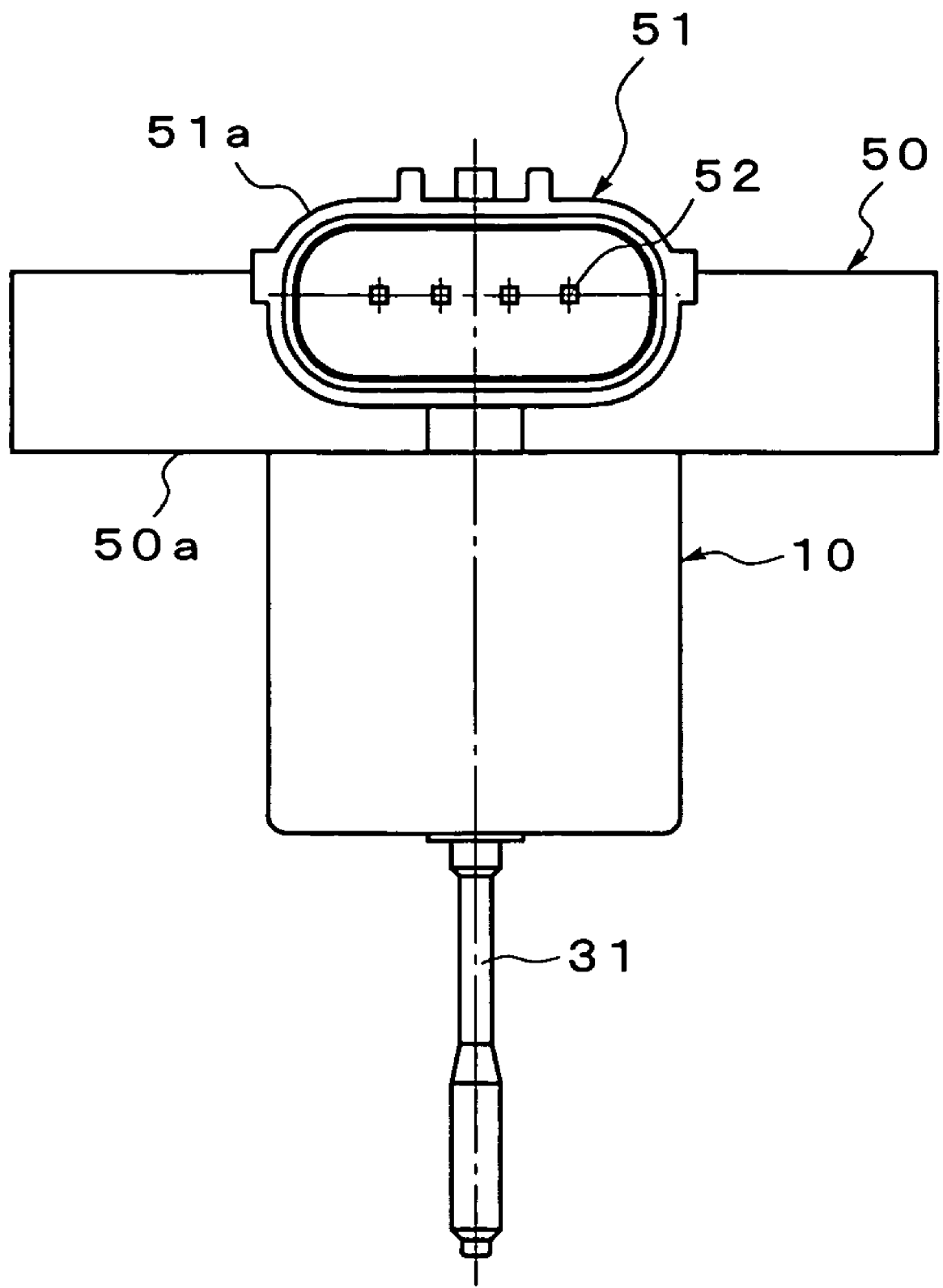
FIG. 2 is a side view showing an appearance of the stepping motor shown in FIG. 1, viewed from the connector direction.

FIG. 1 is a sectional view showing the embodiment to which an enclosed stepping motor in accordance with the present invention is applied, and FIG. 2 is a side view showing an appearance of the stepping motor shown in FIG. 1, viewed from the connector direction.

The stepping motor shown in this embodiment is used as a driving source for such as a mixture flow rate regulating valve (member to which the motor is installed) of a gasoline engine, and is required to have high airtightness in an installed state. Generally, the stepping motor is a device for converting an electric pulse signal to a step operation for mechanical connection and disconnection. The stepping motor shown herein is of a PM type, and is configured so that a rotating magnetic field is produced by changing over a current flowing in a stator coil 21, and a rotor magnet 32 having many magnetized poles is synchronously rotated in the peripheral direction.

This stepping motor is configured so as to include a motor casing 10, a stator 20, a rotor 30, a cover member 40, and a connector body 50.

The motor casing 10 has a peripheral wall portion 11a formed in a cylindrical shape and an end wall portion 11b for closing an opening at one end of the peripheral wall portion 11a, and is formed integrally in a cup shape by a magnetic metal (for example, iron). The stator 20 is provided at the periphery of the rotor 30 in the motor casing 10 to rotationally drive the rotor 30. The stator 20 includes coils 21, bobbins 22, and yokes (referred also to as stator cores) 23 and 24. The rotor 30 is arranged on the inside of the stator 20 in the motor casing 10 to rotationally drive a motor shaft (output shaft) 31 projecting from the interior of the motor casing 10 through a shaft hole 14 formed in the end wall portion 11b. The rotor 30 is configured so as to include a cylindrical rotor body (support shaft portion) 33 fixed coaxially on the outer peripheral surface of the motor shaft 31 and a cylindrical rotor magnet 32 fixed coaxially at the outer periphery of the rotor body 33. The cover member 40 is provided so as to close the other end opening 12 of the motor casing 10. The cover member 40 is integrally formed of a resin so that a radial bearing surface (bearing portion) 42 for supporting a rear end portion of the rotor 30 is provided in the cover member 40. The connector body 50 is integrally formed of a resin so as to seal the other end opening 12 of the motor casing 10 from the outside of the cover member 40. The connector body 50 makes the other end opening 12 of the motor casing 10 completely airtight by being molded (for example, injection molded) in the final process of assembly.

The cover member 40 is formed integrally with the stator 20 using the resin integrally forming the stator 20, and is also formed so as to integrally hold connector pins 52 the distal end portions of which are arranged in the connector body 50 when the connector body 50 is formed. The proximal end portion of the connector pin 52 serves as a terminal 52a for connecting the end portion of the coil 21 of the stator 20.

For example, when the stator 20 and the cover member 40 are integrally formed using a resin for forming bobbins 22, the bobbins 22 and the cover member 40 are injection molded (insert injection molded) at the same time in a state in which the plurality of yokes 23 and 24 and the plurality of connector pins 52 are inserted in a mold. Then, the coils 21 are wound on the bobbins 22, and the end portion of the coil 21 is wound on the terminal 52a of the connector pin 52 and connected thereto by soldering, welding, or the like method. Thereby, the stator 20 integral with the cover member 40 can be obtained.

The terminal 52a of the connector pin 52 is located on the outside in the axial direction of the bobbin 22 of the stator 20, and is provided so as to extend to the outer periphery side of the bobbin 22 along the end surface arranged in the end portion in the axial direction of the bobbin 22.

The connector body 50 and the connector pins 52 form a waterproof connector 51. Also, the cover member 40 is provided with a space 40a which enables the arrangement of terminals 52a of the connector pins 52. This space 40a is formed in the cover member 40 by installing a sub-cover member 40b to the cover member 40, and is opened to the outside by removing the sub-cover member 40b. Specifically, the sub-cover member 40b is provided detachably on the cover member 40 as one component of the cover member 40 to form the space 40a in a portion corresponding to the terminals 52a. The coil 21 can be wound on and connected to the terminal 52a by exposing the terminal 52a, and the terminal 52a etc. are protected by covering the terminal 52a. Also, the cover member 40 closes the whole of the other end opening 12 of the motor casing 10 by means of installation of the sub-cover member 40b.

Also, the motor casing 10 is provided with an outward flange 13 at the peripheral edge of the other end opening 12. In the shaft hole 14 formed in the axis portion of the end wall portion 11b, a bearing bush 15 is fittingly fixed. The outer periphery of the bearing bush 15 has a step portion 16, so that the bearing bush 15 is prevented from coming off from the shaft hole 14 to the front by fitting the step portion 16 in the shaft hole 14 from the inside of the motor casing 10. Also, the bearing bush 15 serves as a thrust bearing Surface 17 in which the inner end surface in the axial direction is formed by a plane in the direction perpendicular to the axis of the rotor 30.

The rotor 30 is inserted in the motor casing 10 through the other end opening 12 of the motor casing 10, and the motor shaft 31 arranged on the axis of the rotor 30 is fitted rotatably in the bearing bush 15. Also, the stator 20 is engaged with the peripheral wall portion 11a of the motor casing 10 so as to be in a state of being close to the outer peripheral surface of the rotor 30.

Also, the stator 20 is configured by providing a pair of bobbins 22, on which the coils 21 are wound, adjacently in the axial direction, and a pair of yokes 23 and 24 are arranged on each of the bobbins 22. The yoke 23, 24 has a plurality of pole teeth 23a, 24a extending in the axial direction along the inner peripheral surface of the bobbin 22 from the end surface in the axial direction of the bobbin 22. The pole teeth 23a, 24a are arranged alternately in the circumferential direction.

The stator 20 constructed as described above is configured so that the peripheral wall portion 11a is brought into close contact with the outer peripheral edge of the yoke 23, 24 by partially decreasing the diameter of the peripheral wall portion 11a in a state in which the stator is inserted in the motor casing 10. Thereby, a closed magnetic circuit is formed by a part of the motor casing 10, the yokes 23 and 24, and the rotor magnet 32.

On the other hand, the rotor body 33 is integrally formed of a resin (material) having a self-lubricating property, and includes a cylindrical portion 33a and a collar portion 33b formed at the outer periphery in the rear end portion in the axial direction of the cylindrical portion 33a. The rotor magnet 32 is engaged with and fixed on the outer peripheral surface in front of the collar portion 33b in the cylindrical portion 33a. Also, the outer peripheral surface at the rear of the collar portion 33b in the cylindrical portion 33a serves as a first sliding surface (outer peripheral surface) 33c rotatably engaged with the radial bearing surface 42, and the tip end surface of the cylindrical portion 33a serves as a second sliding surface (one end surface) 33d that is in slidable contact with the thrust bearing surface 17 of the bearing bush 15. As a resin having a self-lubricating property, PPS (polyphenylene sulfide) with which a solid lubricant is mixed is used.

The rotor 30 is integrated, for example, by injection molding (insert injection molding) the rotor body 33 in a state in which the motor shaft 31 and the rotor magnet 32 are inserted in a mold. Although the rotor 30 is made up of the rotor magnet 32 and the rotor body 33 in this embodiment, the rotor 30 may include the motor shaft 31.

The cover body 40 is provided with a concave portion 41 In the axis portion on the inside. The inner peripheral surface on the opening side of the concave portion 41 serves as the radial bearing surface 42. Specifically, after the rotor 30 is assembled to the motor casing 10, by engaging the cover member 40 to the other end opening 12 of the motor casing 10, the first sliding surface 33c of the rotor body 33 engages rotatably with the radial bearing surface 42 of the cover member 40. Thereby, the front end portion and rear end portion of the rotor 30 are rotatably supported by the bearing bush 15 and the radial bearing surface 42, respectively.

Also, in the farthest portion of the concave portion 41, a small-diameter guide concave portion 43, which enables the introduction of the rear end portion of the motor shaft 31, is formed coaxially with the radial bearing surface 42. In the guide concave portion 43, a steel ball 44 and a pressing spring (urging means) 45 are housed. The pressing spring 45 brings the second sliding surface 33d of the rotor body 33 into contact with the thrust bearing surface 17 of the bearing bush 15 by pressing the steel ball 44 against the rear end surface of the motor shaft 31.

The connector body 50 is molded in the final stage of assembly process so as to wrap the flange 13 of the motor casing 10 from the outside of the cover member 40. Thereby, the other end opening 12 of the motor casing 10 is completely sealed, and the motor casing 10 is fixed firmly. In this case, most portions of the motor casing 10 excluding a portion near the other end opening 12 are in a state of being exposed to the outside.

Also, for the connector body 50, a surface directed to the end wall portion 11b side in the axial direction of the motor casing 10 serves as a flange surface 50a for attaching the aforementioned mixture flow rate regulating valve. This flange surface 50a is formed by a plane perpendicular to the axial direction of the motor casing 10. For example, the motor casing 10 is inserted in an opening of the mixture flow rate regulating valve, and is brought into close contact with a plane-shaped attachment surface at the peripheral edge of this opening, by which the airtightness is kept via a seal member such as an O-ring. Also, for the connector body 50 and the waterproof connector 51 provided with the connector pins 52, a connecting portion 51a for the connection with another connector is directed toward the direction perpendicular to the axial direction of the motor casing 10.

Next, the operation and effects of the stepping motor constructed as described above are explained.

In this stepping motor, the connector body 50 is molded from the outside of the cover member 40 for closing the other end opening 12 of the cup-shaped motor casing 10, by which the other end opening 12 can be sealed surely. Also, since the connector body 50 is provided with the flange surface 50a, the airtightness in the connecting portion with the mixture flow rate regulating valve can be secured sufficiently.

Also, in this stepping motor, since an open loop is used, a current always flows in the coil 21, so that even if the amount of generation of Joule heat increases, the heat can be efficiently dissipated to the outside through the metallic motor casing 10 in the state in which most portions thereof is exposed. In this case, the heat generated in the coil 21 is transmitted to the motor casing 10 via the bobbins 22 and the yokes 23 and 24, and also is directly transmitted from the coil 21 to the motor casing 10 by radiation.

Therefore, the temperature of the coil 21 itself can be decreased, so that poor insulation such as melting of an insulating coating can be prevented, and also thermal deformation of parts such as the coils 21, bobbins 22, yokes 23 and 24, motor casing 10, and cover member 40 can be prevented. Moreover, since the temperature of the coil 21 decreases, there is no fear that thermal demagnetization occurs on the magnet of the rotor 30 close to the coil 21, so that the properties as a motor, such as torque, can be prevented from being deteriorated. Therefore, the durability can be improved.

Also, since the portion covered by a resin is small, a small diameter and light weight can be achieved, and also the cost can be reduced by a decrease in the use of resin.

On the other hand, the other end opening 12 of the motor casing 10 can be closed by inserting the integrated stator 20 and cover member 40 in the motor casing 10, so that the other end opening 12 can be sealed surely merely by molding the connector body 50 from the outside of the cover member 40. Therefore, the manufacture is easy, and hence the productivity can be enhanced.

Also, since the stator 20, the cover member 40, and the connector pins 52 are formed integrally, the number of parts can be decreased. Moreover, since the proximal end portion of the connector pin 52 serves as the terminal 52a for connecting the end portion of the coil 21, work for winding the coil 21 on the stator 20 and for connecting the end portion of the coil 21 to the terminal 52a by soldering etc. can be carried out continuously, and also this work can be mechanized. Since the terminal 52a is provided so as to extend on the outer peripheral side of the bobbin 22 along the end surface in the axial direction of the bobbin 22, the end portion of the coil 21 can be connected easily by the terminal 52a. Therefore, the assembling work and assembling process can be simplified, so that the proportion defective can be decreased, and also the cost can be reduced.

Further, since the sub-cover member 40b for enabling the exposure of the terminal 52a is provided in a portion corresponding to the terminal 52a in the cover member 40, the connection of the end portion of the coil 21 to the terminal 52a is easy, and also the other end opening 12 of the motor casing 10 is closed surely to surely prevent the resin from intruding into the motor casing 10 when the connector body 50 is molded.

Also, the rotor body 33 is formed of a resin (PPS) having a self-lubricating property, and the first sliding surface 33c formed on the rotor body 33 is directly engaged slidably With the radial bearing surface 42 of the cover member 40 forming a motor housing 81 to obtain a radial supporting force. Therefore, the radial bearing (roller bearing shown in the conventional example), which must be installed usually, can be omitted. Similarly, since the configuration is such that the second sliding surface 33d of the rotor body 33 is directly in slidably contact with the thrust bearing surface 17 of the bearing bush 15, the thrust bearing, which must be installed usually, can be omitted. Therefore, the number of parts can be decreased, and a small size, light weight, and low cost can be achieved. Also, the productivity can be enhanced by the simplification of construction.

Further, since the rotor body 33 is formed of a resin having a self-lubricating property, the rotor body 33 can be molded easily by injection molding (molding), and also in the process of molding, the motor shaft 31 and the rotor magnet 32 can be fixed surely to the rotor body 33.

Also, since the urging force of the pressing spring 45 is transmitted to the rotor body 33 via the steel ball 44 and the motor shaft 31, and thereby the rotor body 33 is urged against the second sliding surface 33d side, the second sliding surface 33d is always in contact with the thrust bearing surface 17. Therefore, the rotor 30 can be prevented from being displaced in the axial direction. Moreover, since the steel ball 44 is in contact with the axis position of the end surface of the motor shaft 31, rotational resistance produced on the rotor 30 can be kept at a minimum.

Although the above-described embodiment is configured so that the motor shaft 31 is rotated integrally with the rotor 30, the configuration may be such that the motor shaft 31 is moved linearly by the rotation of the rotor 30. Specifically, the configuration may be such that an external thread portion provided in an inner peripheral portion of the rotor body 33 is engaged with an internal thread portion provided in an outer peripheral portion of the motor shaft 31, by which the motor shaft 31 is moved in the axial direction along with the rotation of the rotor 30.

Also, although an example in which the present invention is applied to a stepping motor has been shown in this embodiment, the present invention can be applied to other types of motors.

Further, although this embodiment is configured so that the motor shaft 31 and the rotor magnet 32 are fixed to the rotor 30 by injection molding the rotor body 33, the configuration may be such that the motor shaft 31 is put under pressure on the inner peripheral surface of the rotor body 33, and the rotor body 33 is put under pressure on the inner peripheral surface of the rotor magnet 32, by which the motor shaft 31 and the rotor magnet 32 are fixed to the rotor body 33. In this case as well, the rotor body 33 can be fixed easily.

Also, the configuration may be such that the motor shaft 31, the rotor body 33, and the rotor magnet 32 may be fixed integrally with an adhesive. Further, the configuration may be such that a resin magnet is used as the rotor magnet 32, and this resin magnet is molded integrally with the outer peripheral surface of the rotor body 33, by which the rotor magnet 32 is fixed on the outer peripheral surface of the rotor body 33. Specifically, the rotor magnet 32 can be fixed on the outer peripheral surface of the rotor body 33 by post-molding of resin magnet.

Figure 3:
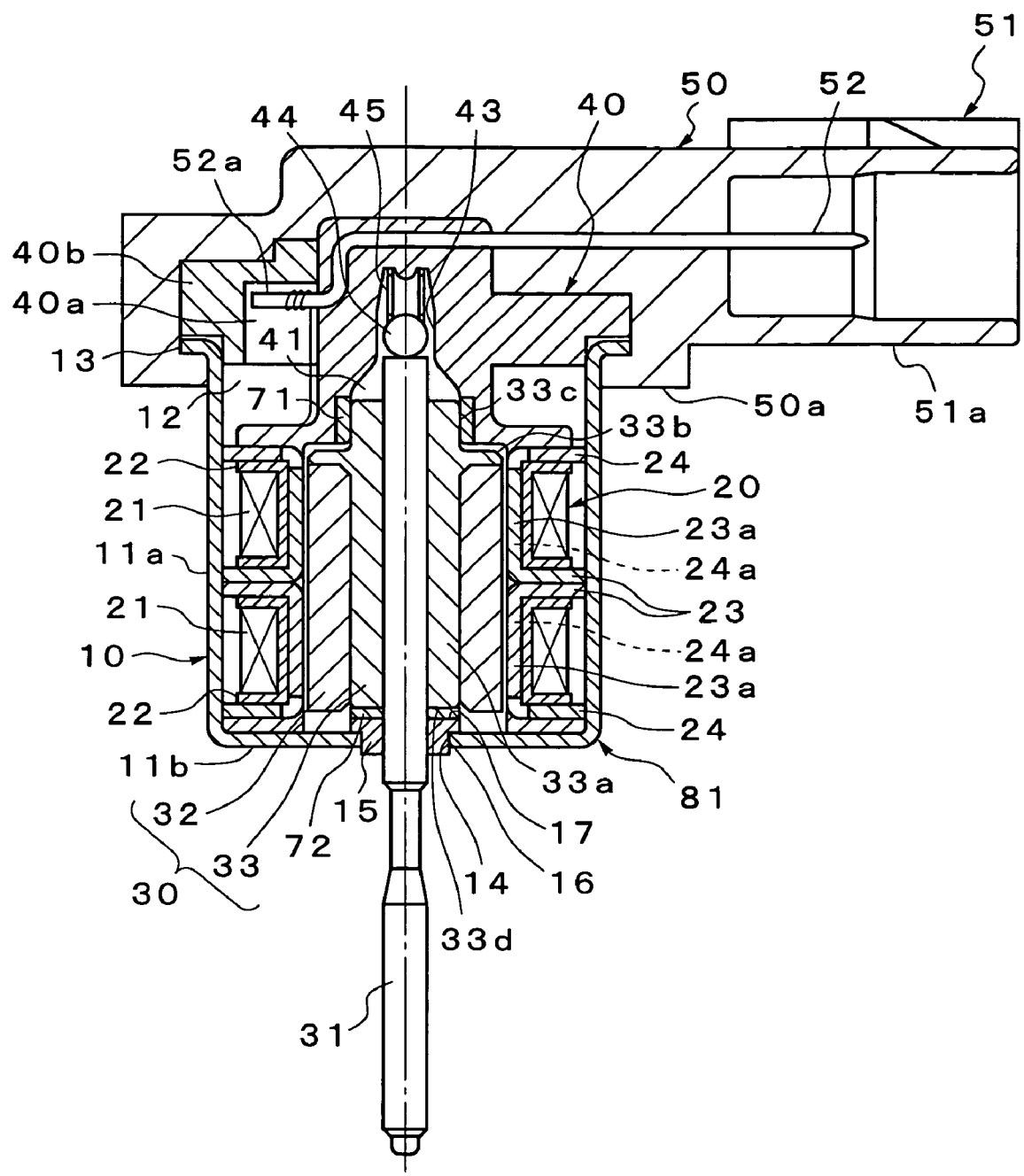
FIG. 3 is sectional view of a stepping motor according to a modification of the structure shown by FIG. 1.

In the embodiment of the invention described above, the radial bearing surface 42 for supporting the rear end of the rotor body 33 is formed on the interior of the cover member 40. However, this can be modified such that, as shown in FIG. 3, a small-sized tubular member 71 having a wear-resistant property is provided on the inner portion (at the rotary support portion) of the cover member 40 so that the outer circumferential surface of the rotor body 33 is rotatably supported through the tubular member 71. This modification permits restriction of frictional wear at the rotor body 33 and its rotary support member and also can provide improvements in durability and accuracy of parts (especially, accuracy of parts in the radial direction), with maintaining the pursuit of miniaturization. Similarly, a small disc-shaped member 72 of wear-resistant property can be mounted between the bearing bush 15 and the end of the rotor body 33, so that frictional wear of the second sliding surface 33d (one end surface) of the rotor body 33 and the thrust bearing surface 17 of the bearing bush 15 can be restrained and, therefore, accuracy of parts (particularly, accuracy of the parts in the thrust direction) and durability as well as pursuit of miniaturization (downsizing) can be attained.

INDUSTRIAL APPLICABILITY

According to the present invention, a bearing having been used conventionally and a resin for covering the motor can be omitted, so that the motor can be made small in size. Also, the heat dissipating properties are improved, so that the durability can be increased.

The invention claimed is:

1. An enclosed motor, comprising:
    a metallic motor casing having a peripheral wall portion formed in a cylindrical shape and an end wall portion for closing one end opening of the peripheral wall portion;
    a rotor provided in said metallic motor casing to drive an output shaft projecting from said metallic motor casing through a shaft hole in the end wall portion;
    a stator provided at a periphery of said rotor in said metallic motor casing to rotationally drive said rotor;
    a cover member provided to close another end opening of said metallic motor casing; and
    a connector body integrally formed of a resin so as to close the other end opening of said metallic motor casing from outside of said cover member,
    wherein said cover member is formed integrally with said stator using a resin for integrally forming said stator, and is formed so as to integrally hold a connector pin, a portion on a distal end side of which is arranged in said connector body when said connector body is molded, and a proximal end portion of said connector pin serving as a terminal for connecting an end portion of a coil in said stator, and the terminal is located outside a bobbin in an axial direction of the bobbin on which said coil in said stator is wound, and the terminal extends from an inner peripheral side of the bobbin along and parallel to an end surface of the bobbin, the end surface being an end of the bobbin in the axial direction, and the portion on the distal end side of the connector pin which is arranged in said connector body is provided so as to extend to an outer periphery side of the bobbin along and parallel to the end surface of the bobbin.

2. The enclosed motor according to claim 1, wherein said connector body is configured so that a surface directed toward the end wall portion side in the axial direction of said metallic motor casing serves as a flange surface for being installed to a member to which the motor is installed by being brought into contact with the member to which the motor is installed.

3. The enclosed motor according to claim 1, wherein said rotor has a support shaft portion formed of a material having a self-lubricating property and a rotor magnet fixed on an outer peripheral surface of the support shaft portion, and the outer peripheral surface of the support shaft portion is supported rotatably.

* * * * *